United States Patent [19]

Cao et al.

[11] Patent Number: 5,541,535
[45] Date of Patent: Jul. 30, 1996

[54] CMOS SIMULTANEOUS TRANSMISSION BIDIRECTIONAL DRIVER/RECEIVER

[75] Inventors: Tai A. Cao; Satyajit Dutta; Thai Q. Nguyen; Thanh D. Trinh; Lloyd A. Walls, all of Austin, Tex.

[73] Assignee: International Business Machines Corporation, Armonk, N.Y.

[21] Appl. No.: 357,885

[22] Filed: Dec. 16, 1994

[51] Int. Cl.$^6$ .............................................. H03K 19/0185
[52] U.S. Cl. .............................. 326/83; 326/86; 375/257; 370/27
[58] Field of Search .............................. 375/257; 370/24, 370/27, 32; 326/82, 83, 86; 327/52

[56] References Cited

U.S. PATENT DOCUMENTS

| | | |
|---|---|---|
| 3,612,781 | 10/1971 | DaCosta . |
| 4,162,371 | 7/1979 | Belforte .................................. 370/27 |
| 4,590,396 | 5/1986 | Koike . |
| 4,599,522 | 7/1986 | Matsuo et al. . |
| 4,604,740 | 8/1986 | Gandini et al. ......................... 370/32 |
| 4,872,121 | 10/1989 | Chan et al. . |
| 4,914,583 | 4/1990 | Weisshaar et al. . |
| 4,931,672 | 6/1990 | Khan . |
| 5,047,919 | 9/1991 | Sterling et al. . |
| 5,109,486 | 4/1992 | Seymour . |
| 5,187,392 | 2/1993 | Allen . |
| 5,206,544 | 4/1993 | Chen et al. . |
| 5,216,295 | 6/1993 | Hoang ..................................... 326/83 |
| 5,216,667 | 6/1993 | Chu et al. . |
| 5,243,623 | 9/1993 | Murdock . |
| 5,266,848 | 11/1993 | Nakagome et al. . |
| 5,281,869 | 1/1994 | Lundberg . |

FOREIGN PATENT DOCUMENTS

| | | |
|---|---|---|
| 0186142 | 7/1986 | European Pat. Off. ................ 370/27 |
| 0574168A2 | 5/1993 | European Pat. Off. . |

OTHER PUBLICATIONS

East, D. G.; "Full Duplex Interface Circuit"; IBM Technical Disclosure Bulletin vol. 21, No. 6, Nov. 1978; p. 2454.

*IBM Technical Disclosure Bulletin,* Sep. 1980, "Simultaneous Bidirectional Transceiver Circuit", A. Y. Chang et al, vol. 23, No. 4.

*IBM Technical Disclosure Bulletin,* Apr. 1980, "Component Mismatch Accommodation For Bidirectional Chip to Chip Communication", C. R. Hoffman, vol. 22, No. 11.

*IBM Technical Disclosure Bulletin,* Mar. 1990, "Fast On–Module Driver/Receiver Scheme", W. Haug et al, vol. 32, No. 10A.

*IBM Technical Disclosure Bulletin,* Feb. 1976, "Low Power Bidirectional Driver Receiver Circuit for a Solid–State Memory", R. T. Dennison et al, vol. 18, No. 9.

*IBM Technical Disclosure Bulletin,* Jun. 1975, "Bidirectional Signal Level Converter for Interchip Communication", R. Pelc et al, vol. 18, No. 1.

*IBM Technical Disclosure Bulletin,* Dec. 1990, "Improved Methods for Inter–Chip Clock and Data Distribution", D. J. Craft, vol. 33, No. 7.

*IBM Technical Disclosure Bulletin,* Mar. 1991, "Unidirection/Bidirectional Drivers for Channel Interface", S. S. Uy, vol. 33, No. 10A.

*Primary Examiner*—Edward P. Westin
*Assistant Examiner*—Benjamin D. Driscoll
*Attorney, Agent, or Firm*—Mark E. McBurney

[57] ABSTRACT

A CMOS driver/receiver pair is provided which includes a non-inverting buffer in the input path to a differential receiver circuit. The non-inverting buffer allows a plurality of different voltages, and corresponding voltage swings, to be possible. This allows the differential receiver to compare the input voltage received from the transmission line with the output from its associated driver. Therefore, the receiver is capable of determining the voltage level (and the corresponding logic level) input from the transmission at the same time its associated driver is outputting a logic signal to another driver/receiver pair, via the transmission line. A single voltage source is utilized to provide multiple positive voltages to the differential receivers, such that differences in voltage levels which correspond to different logical combinations of "1" and "0" can be determined by the receiver.

19 Claims, 5 Drawing Sheets

CMOS SIMULTANEOUS TRANSMISSION BIDIRECTIONAL DRIVER/RECEIVER

CROSS REFERENCE TO RELATED APPLICATIONS

U.S. patent application Ser. No., 08/246,121, filed Jun. 22, 1994, assigned to the assignee of the present invention having attorney docket number AT9-94008.

BACKGROUND OF THE INVENTION

1. Field of the Invention

The present invention relates to a driver/receiver pair ("transceiver") which allows simultaneous bidirectional communications. More specifically, a system is provided which allows a first driver/receiver circuit to concurrently communicate signals between a second driver/receiver circuit.

2. Description of Related Art

Transceivers which bidirectionally and simultaneously send information between different driver/receiver circuits along a transmission line are known in the art. However, these circuits have heretofore been implemented using bipolar technology. Bipolar logic is also referred to as transistor-transistor logic. In bipolar logic, a digital signal technique is used wherein a positive voltage signal and ground is alternated between a negative voltage signal and ground. Thus, multiple voltage sources are required for this type of technology to be implemented.

Complementary method oxide semiconductor (CMOS) technology pairs transistors together which complement one another and use varying positive voltage swings to activate/deactivate the circuits causing a logical "1" and/or logical "0" to be communicated to one another. Due to the positive and negative voltage requirements of bipolar circuits, multiple separate voltage sources are needed to implement this technology.

U.S. Pat. No. 3,612,781 describes simultaneous bidirectional transmission system using bi-polar circuits which require voltage differences of both above and below a reference voltage, as shown in FIGS. 2 and 3, thus requiring multiple voltage sources.

U.S. Pat. No. 5,216,667 discusses a bi-polar simultaneous bidirectional transceiver which utilizes a plurality of positive and negative voltage sources, i.e. Vcc, Vee, Vr, Vt and Vx.

It can be seen that none of the prior art systems utilize a CMOS driver/receiver pair which can simultaneously send and receive information in a single transmission line using only a single voltage source. Thus, a need exists for a communications system, such as the present invention, which allows information to be bidirectionally and simultaneously transmitted and received on a single line, while using only a single voltage source, thereby allowing circuits with significantly less electrical power and cooling requirements.

SUMMARY OF THE INVENTION

In contrast to the prior art, the present invention provides a CMOS driver/receiver pair which simultaneously transmits and receives information on a single transmission line, while utilizing only a single voltage source.

Broadly, the present invention is a CMOS driver/receiver pair which includes a non-inverting buffer in the input path to a differential receiver circuit. The non-inverting buffer allows a plurality of different voltages, and corresponding voltage swings, to be possible. This allows the differential receiver to compare the input voltage received from the transmission line with the output voltage from its associated driver. Therefore, the receiver is capable of determining the voltage level (and the corresponding logic level) input from the transmission at the same time its associated driver is outputting a logic signal to another driver/receiver pair, via the transmission line.

The present invention uses a single voltage source to provide multiple positive voltages to the differential receivers, such that differences in voltage levels which correspond to different logical combinations of "1" and "0" can be determined by the receiver.

The present invention is a system that provides simultaneous, bidirectional transfer of signals between integrated circuit devices. The system of the present invention includes a first and second driver/receiver pair, each having a differential receiver therein. A voltage source with multiple non-negative voltage signals is also provided wherein the non-negative signals indicate the state of the logic signals which are concurrently input to the differential receiver from the transmission line and the driver.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
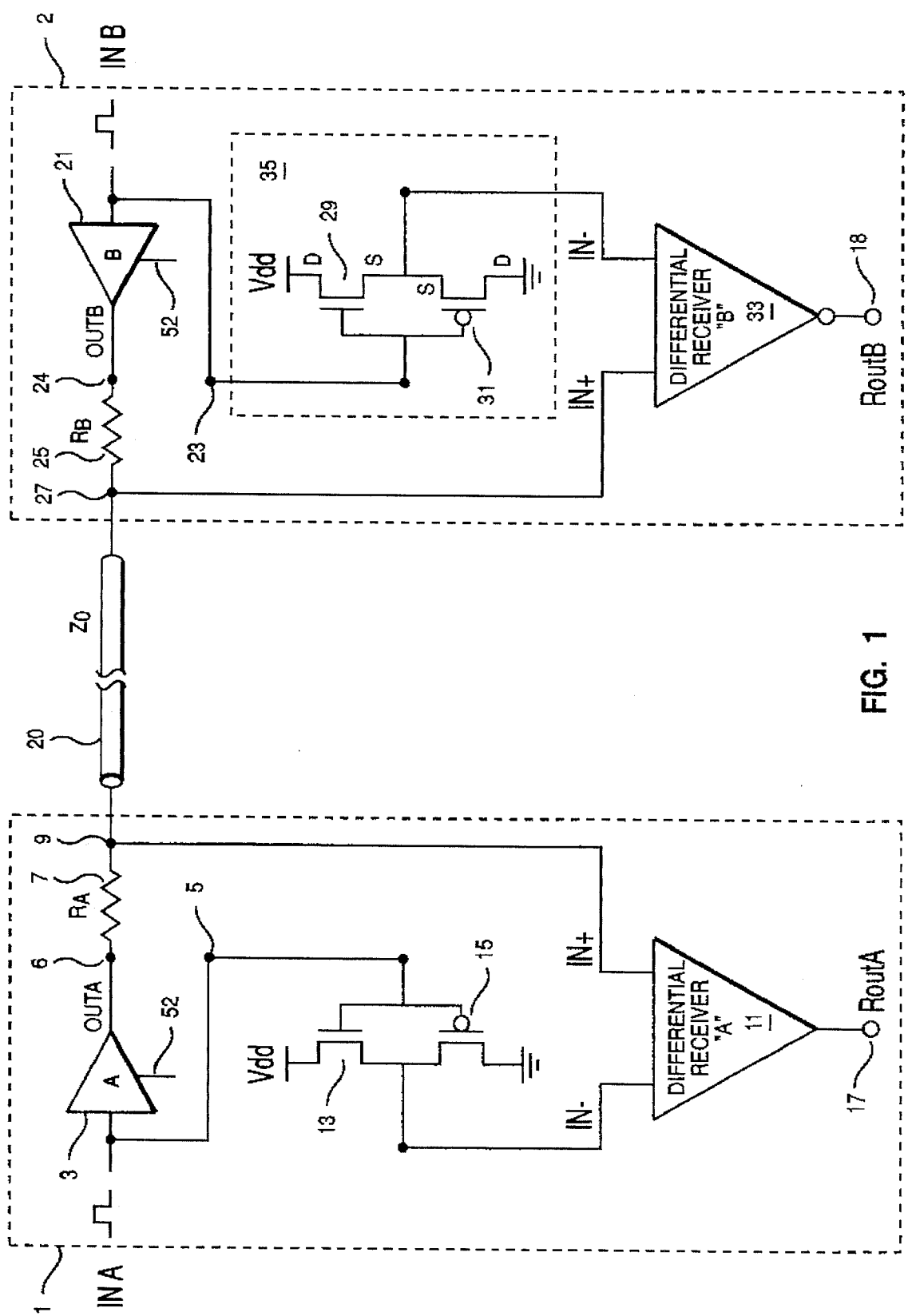
FIG. 1 is a schematic diagram of the present invention showing first and second driver/receiver pairs interconnected with a transmission line and having a non-inverting buffer in the input path to the differential receiver for providing variable positive voltages in accordance with a first preferred embodiment of the present invention.

Referring to FIG. 1, a schematic diagram is shown having two driver/receiver pairs A and B (transceivers), generally referred to by reference numerals 1 and 2, respectively. The drivers 3 and 21 receive inputs INA and INB, respectively. Driver/receiver pair 1 includes a driver 3 which is any one of a typical driver circuit, as described in more detail with regard to FIG. 2. This driver is also capable of achieving a tri-state, or high impedance output state when operated in a unidirectional mode. The output of driver 3 enters a node 6 which is connected to a terminating resistor 7 (Ra). The input to driver 3 is also connected to a node 5 which is connected to transistors 13 and 15, which is connected as a non-inverting buffer. Transistor 13 is a "N" type device which is "turned on", i.e. it will present a low impedance between its source and drain, when a voltage potential is placed at its gate, with respect to ground. Transistor 15 is a "P" type device which is turned on when there is no voltage potential at its gate node, with respect to ground. In digital circuits the presence of a voltage is considered to be a logical "1" and the absence of a voltage is a logical "0". Thus, a "N" type device is turned on when a logical "1" is placed at its gate and turned off when a logical 0 is input. Conversely, a "P" type device is turned on when a logical "0" is placed at its gate and turned off when a logical "1" is input. The output of transistors 13 and 15 is then used as one input to a differential receiver circuit 11 that outputs signal ROUTA. Receiver 11 is a typical differential receiver and is shown in greater detail in FIG. 3. Resistor 7 is also connected to node 9 which is used as the other input to differential receiver 11. Additionally, node 9 is connected to a transmission line 20 which interconnects driver receiver pairs 1 and 2. Transmission line 20 has a characteristic impedance Zo which is matched by the impedance of terminating resistor Ra 7 plus the impedance of driver A 3 (Ra+Rda). The transmission line impedance is also matched by terminating resistor Rb 25 plus the impedance of driver B 21 (Rb+Rdb). Signal reflection will be minimized by matching the impedance of the drivers and resistors 3, 7 and 21, 25, respectively, with the impedance of transmission line 20. It is desirable to have resistors Ra and Rb placed on the same integrated circuit, or chip, as the driver/receiver pairs, although the placing the resistors off the chip is contemplated by the scope of the present invention. Resistors, 7 and 25 must be of equal value in order for the impedance to match. The sum of resistor Ra 7 and the impedance of driver 3 must be equal to the impedance of transmission line 20. Similarly, the sum of resistor 25 and the impedance of driver 21 must also be equal to the impedance of transmission line 20. Transceivers 1 and 2 simultaneously communicate with one another over line 20. It should be noted that the precise location of transceivers 1 and 2 in the data processing system is not crucial to the present invention. That is, transceivers 1 and 2 may be physically located on the same or different chips. Therefore, the present invention will apply to both intra-chip, and chip to chip communications in a data processing system.

Transceiver 2 is identical to transceiver 1. A driver 21 is provided which is connected to a resistor 25 (Rb), via node 24, and a pair of transistors 29 and 31 (through node 23), connected as a non-inverting buffer. Transistor 29 is a "N" type and transistor 31 is a "P" type, the distinction being described above. The output of the transistor pair is provided as input to a differential receiver circuit 33. Resistor 25 is connected to a node 27 which, in turn is connected to transmission line 20, and input to the differential receiver circuit 33, which outputs a signal ROUTB on node 18.

Reference numeral 35 relates to the non-inverting buffer circuit shown by transistors 29 and 31. It should be noted that the following description applies equally to the non-inverting buffer circuit formed by transistors 13 and 15, however, for the sake of simplicity, a single description is included herein. The non-inverting buffer includes "N" device 29 with its drain connected to Vdd, and "P" device 31 having its drain connected to ground. In a preferred embodiment the voltage of the input signal from node 23 will be in the range of 0 to 2.5 volts, where 0 is ground and 2.5 v is Vdd. If the threshold voltage of transistors 29 and 31 is 0.7 volts, then the signal output to the differential receiver 33 (IN–) will have a voltage swing of from 0.7 to 1.8 volts.

Due, to its non-inverting low voltage swing, the buffer 35 serves as a,non-inverting, dynamically varying reference voltage that,does not swing below ground potential. Thus, non-inverting buffer 35 provides the reference voltage for the differential receiver.

When the voltage level at node 23 is a logical "1", then transistor 29 is turned on and transistor 31 is turned off. In this case, since the threshold voltage of the transistor is 0.7 volts, a voltage drop of 0.7 volts is effectively placed across transistor 29. And, since 2.5–0.7=1.8, a voltage of 1.8 v is input to the differential receiver 33 as IN–. However, if a logical "0" is present on node 23 and input to transistors 29 and 31, then "P" type transistor 31 is turned on and "N" type transistors 29 is turned off. Therefore, the threshold voltage of 0.7 volts is placed across transistor 31. Since, transistor 31 is connected to ground, or 0 volts, the threshold voltage is added to the ground potential. In this case, 0+0.7=0.7, and a voltage of 0.7 volts is present at the input to differential circuit 33. As noted above, the previous description also applies to transistors 13 and 15, included in transceiver 1.

Figure 2:
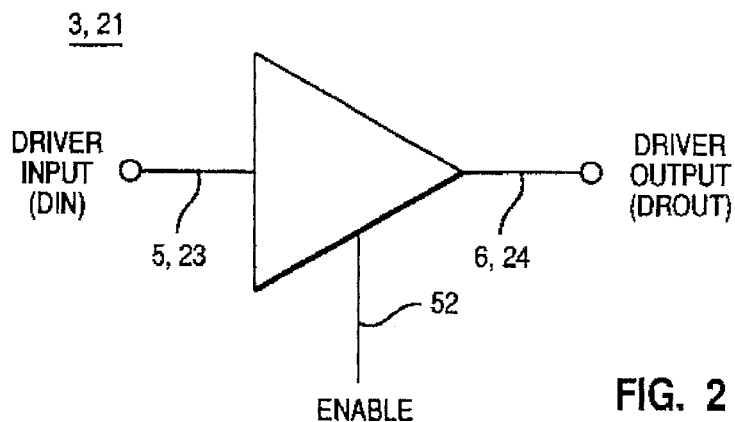
FIG. 2 is a circuit diagram showing a typical driver which can be used by the present invention.

Referring to FIG. 2, a typical driver capable of being used by the present invention is shown. Reference numerals 3 and 21 indicate that the driver shown in FIG. 2 is one that may be used by the present invention in the circuit of FIG. 1. Input node 5, 23 corresponds to the input of drivers 3, 21, respectively, as shown in FIG. 1. Similarly, output nodes 6, 24 correspond to the output of drivers 3 and 21 of FIG. 1. Enable node 52 is connected to the driver circuit and controls it based on the input.

The operation of the driver circuit of FIG. 2 will now be described using driver 3 as an example. However, it should be noted that driver 21 will operated in precisely the same manner. If a logical one is applied to the input node 5, and the enable node 52 is active, then the output node 6 will be driven to a voltage level that is close to the Vdd voltage level. Thus, when a logical one is applied to the input 5, and node 52 is enabled, then a logical one will output at node 6. Conversely, if a logical zero is applied to the input node 5, with the enable node 52 activated the output node 6 will be driven to a voltage that is close to ground potential, or zero volts. In this manner, a logical zero input, with node 52 enabled, will cause a logical zero to be driven onto node 6. If the enable node is not activated, the output node 6 is placed in a high impedance state (tri-stated) and drivers 3, 21 (for example) will not respond to changes in the input voltage at nodes 5, 23. Those skilled in the art will understand that enable node 52 is controlled by a control unit, such as a microprocessor, embedded controller, I/O controller, memory controller, or the like. When the control unit (not shown) determines that a logical "1" or logical "0" should be output, an enable signal is presented to drivers 3, 21 at node 52. In this manner, the output of transceivers 1 and 2 at nodes 6 and 24, respectively, is controlled.

Figure 3:
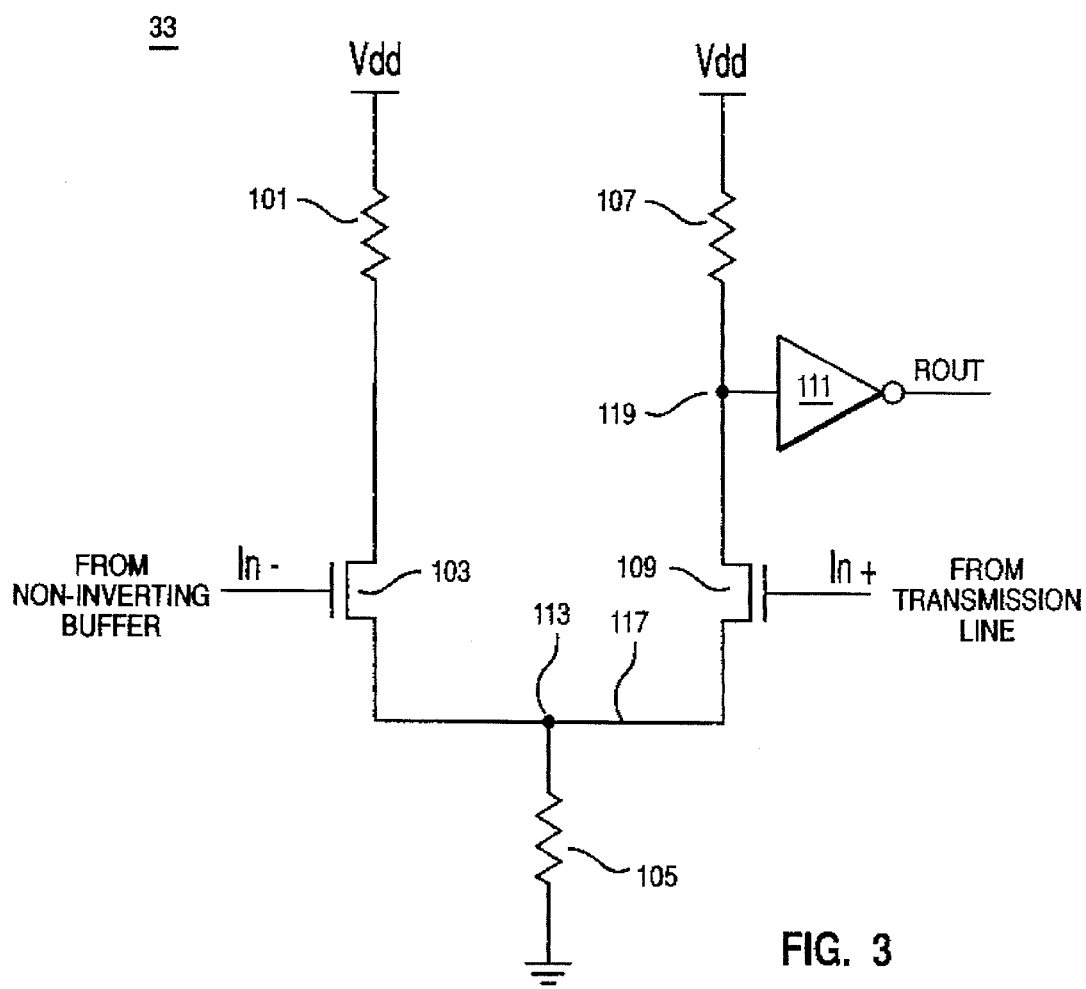
FIG. 3 is another circuit diagram of a differential receiver capable of being used in the system of the present invention.

FIG. 3 is a schematic diagram of a differential receiver circuit 33 used in a preferred embodiment of the present invention. The output of non-inverting buffer 35, described previously, is input to differential circuit 33 at transistor 103. Transmission line 20 is connected to receiver circuit 33 at transistor 109. Line 117 connects transistors 103 and 109. Circuit 33 also includes resistors 101 and 107, connected to Vdd, as well as resistor 105, which is connected to ground. As noted above, the output of non-inverting buffer 35 will either be 0.7 volts or 1.8 volts. These voltage inputs are supplied to the gate of transistor 103 (IN–). The voltage inputs to transistor 109 (IN+) will be either 2.5, 0, or 1.25 volts, depending on whether one or both of drivers 3 and 21 are outputting logical 1's and 0's to transmission line 20

(and what combination of 1's and 0's are being driven onto the line). The transistors 103 and 109 of receiver circuit 33 (and 11) have the same values, and based on the voltage input will cause either a logical 0 or a logical 1 to be output to inverter 111 and ultimately to another integrated circuit device that requiring the digital signal.

| | Receiver 33 | | | | |
|---|---|---|---|---|---|
| TRAN. LINE | NODE 27 | NODE 23 | IN+ | IN– | ROUT |
| 2.5 v | 2.5 v | 2.5 v | 2.5 v | 1.8 v | 2.5 v |
| 0.0 v | 0.0 v | 0.0 v | 0.0 v | 0.7 v | 0.0 v |
| 1.25 v | 1.25 v | 0.0 v | 1.25 v | 0.7 v | 2.5 v |
| 1.25 v | 1.25 v | 2.5 v | 1.25 v | 1.8 v | 0.0 v |

The previous table represents the various inputs, and corresponding outputs, of differential receiver circuit 33. In a preferred embodiment, a logical "1" is represented by 2.5 volts (Vdd) and a logical "0" is indicated when 0.0 volts (ground) is transmitted. As noted previously, only differential receiver 33 will be described, however, it should be understood that the description will apply equally as well to receiver 11.

Transmission line 20 is interconnected with both drivers 3 and 21 through terminating resistances 7 and 25, respectively.

In the first case (mode 1) where both drivers 3 and 21 are outputting 2.5 volts, there will be 2.5 volts on transmission line 20, due to the fact that no DC current will flow in steady state conditions. Since no current is flowing through terminating resistances 25 and 7, there will be no voltage drop across resistors 7 and 25. This 2.5 volts at node 27 is then input to receiver circuit 33 at transistor 109 (IN+). The 2.5 volts which is input to driver 21 is provided to non-inverting buffer 35 from node 23. The non-inverting buffer 35 then outputs 1.8 volts (2.5 volts–0.7 volt threshold of transistor 29) which is input to transistor 103 of receiving circuit 33 (IN–). The 2.5 volts at transistor 109 and 1.8 volts at transistor 103 cause them to turn on, thereby creating a path through node 113 to resistor 105. Those skilled in the art will understand that an "N" channel field effect transistor (FET) can be substituted for device 105. The data of the N channel transistor can then be used to disable the receiver when it is not being used and therefore eliminate the DC current flow through the differential amplifier. The characteristics of transistors 103 and 109 are identical, however, the impedance of these devices will vary based upon the input voltage. Thus, in mode 1, the impedance across transistor 109 will be less than the impedance presented by transistor 103. Since the values of resistors 101 and 107 are identical, the current path from Vdd to ground will be through resistor 105, transistor 109, and resistor 107. This lower impedance path causes a higher current flow through node 119, causing a lower voltage to be present. This low voltage (substantially ground) effectively causes node 119 to be at a logical "0". Inverter 111 then supplies 2.5 volts, or a logical "1" as the output of receiver circuit 33 (ROUT).

In the second case (mode 2) both drivers are sending a logical "0". In this case there will be 0.0 volts input to transistor 109 from transmission line 20, via node 27 (IN+). Additionally, the input at node 23 is 0.0 volts which causes transistor 31 to turn on and provide a 0.7 volt input to transistor 103 of receiver circuit 33. The 0.0 volt input to transistor 109 will not turn it on, thereby effectively creating an open circuit. However, the 0.7 volts input to transistor 103 will turn it on allowing current to flow through resistor 101, transistor 103 and resistor 105. Node 119 is connected to Vdd (2.5 volts) through resistor 107 and there is no current flowing through resistor 107 and transistor 109. Therefore, the voltage at node 119 is allowed to reach Vdd. This voltage causes a logical "1" to be input to inverter 111 and a logical "0" to be output therefrom.

In mode 3, it is assumed that driver 3 is outputting a logical "1" signal of 2.5 volts and driver 21 is outputting a logical "0" of 0.0 volts. In this case, the 2.5 volt signal from driver 3 is divided across resistor 7 (which is a terminating resistance and will halve the voltage) causing 1.25 volts to present on transmission line 20. This 1.25 volts is also present at node 27 and is input to transistor 109 of receiver 33 as IN+. At the same time, 0.0 volts is input to non-inverting buffer 35 via node 23, causing 0.7 volts to be output to the gate of transistor 103. Thus, both transistors 103 and 109 will be turned on, however, transistor 109 will have a lower impedance, due to the higher input voltage. Therefore, the current will flow through resistor 107, transistor 109 and resistor 105, such that a logical "0" will be present at node 119. Inverter 111 will then provide a logical "1" signal of 2.5 volts out as ROUT.

Oppositely, yet similar to mode 3, mode 4 occurs when driver 3 is outputting a logical "0" of 0.0 volts and driver 21 is outputting a logical "1" of 2.5 volts. In this instance, the 2.5 volt output of driver 21 is divided across resistor 25 such that a voltage of 1.25 v is placed on transmission line 20 and input to receiver circuit 33 at transistor 109. The 2.5 volts input to driver 21 is also provided to non-inverting buffer 35 via node 23. The 2.5 volt input will generate a 1.8 volt output from circuit 35, which is input to transistor 103 of receiver circuit 33. The 1.8 volts input to transistor 103 will turn it on and present less impedance than transistor 109, due to the smaller 1.25 voltage input transistor 109. Therefore, in this case, the current path will be through resistor 101, transistor 103 and resistor 105. This causes a voltage to be present at node 119 and inverter 111 will output a logical "0" as ROUT.

The previous example has been shown with reference to receiver circuit 33, however receiver circuit 11, in conjunction with the non-inverting buffer formed by transistors 13 and 15 will operated in exactly the same manner. Therefore, it can be understood from the previous example how driver/receiver circuits 3 and 11, and driver/receiver pair 21 and 33 can operated independently and in parallel to simultaneously and bidirectionally transmit digital signals along transmission line 20.

Further, in mode 1, since both drivers have output voltages of 2.5 volts, a steady state condition occurs where no current flows in transmission line 20 and voltage at nodes 9 and 27 will be 2.5 volts. In this case a voltage of 2.5 volts will be input as IN+ to both receiver circuits 11 and 33. At the same time, the non-inverting buffers supply 1.8 volts to both receivers as IN–. Since the voltage at IN+ is greater than the voltage at IN– (for both receivers), a logical "1" is output and effectively transmitted from one driver/receiver pair to the other.

In mode 2, when both drivers output voltages of 0.0 volts, no steady state current flows in transmission line 20 and the voltage at nodes 9 and 27 will be 0.0 volts and input to receivers 11 and 33 as IN+. Concurrently, the non-inverting buffers provide 0.7 volts to the differential receiver circuits 11 and 33 as IN–. Since IN– is greater than IN+, the differential receivers 11 and 33 will output a 0.0 volts demonstrating how a logic "0" can be simultaneously, bidirectionally transmitted between transceivers 1 and 2.

During mode 3, driver 3 is outputting a logical "1" and driver 21 is outputting a logical "0". In this case, the voltage at nodes 9 and 27 will be 1.25 volts and input to receivers 11 and 33, respectively, as IN+. In the case of receiver 11, 2.5 volts is input to the non-inverting buffer circuit including transistors 13 and 15, such that a voltage of 1.8 is output to receiver 11 as IN–. With regard to receiver 11, since IN– is greater than IN+, a logical "0" is output from receiver 11. However, due to the 0.0 volts input to non-inverting circuit 35, via node 23, 0.7 volts is input to receiver 33 as IN–. Thus, since IN– is less than the 1.25 volts input to receiver 33 as IN+, a logical "1" is output. This description illustrates how transceiver 2 simultaneously transmits a logical "0" and receives a logical "1" from transceiver 1. Similarly, transceiver 1 simultaneously transmits a logical "1" and receives a logical "0" from transceiver 2.

Mode 4 is similar to mode 3 except that driver 3 is outputting a logical "0" and driver 21 is outputting a logical "1". In mode 4, the voltage at nodes 9 and 27 will again be 1.25 volts and input to receiver 11 and 33, respectively, as IN+. Zero volts is input to the non-inverting buffer including transistors 13 and 15, and a voltage of 0.7 is output to receiver 11 as IN–. Since, the 0.7 volts of IN– is less than the 1.25 volts of IN+, a logical "1" will be output by receiver 11. With regard to receiver 33, 2.5 volts is input to non-inverting buffer 35, causing 1.8 volts to be supplied to receiver 33 as IN–. Receiver 33 then outputs a logical "0" since IN– is greater than the 1.25 volts inputs as IN+. Thus, transceiver 1 is able to transmit a logical "0" to transceiver 2, while concurrently receiving a logical "1" therefrom. Additionally, transceiver 2 sends a logical "1" to transceiver 1 and simultaneously receives a logical "0" from it.

A first preferred embodiment has been previously discussed wherein driver/receiver pairs 1 and 2 are physically located on the same chip. This allows the chip designer to know exactly what driver circuit is transmitting a signal, what receiver circuit is receiving the signal. Thus, in the manner discussed above, the two driver/receiver pairs 1 and 2 of FIG. 1 are capable of bi-directional, simultaneous transmission of logic signals therebetween.

Further, in a second preferred embodiment, the transceiver circuits 1 and 2 can be used individually in conjunction with any other driver or receiver which is physically located on a separate IC chip. Thus, a chip designer/manufacturer may use, for example, the driver/receiver circuit 1 of FIG. 1 as the I/O interface to circuitry on a different chip, potentially fabricated by a different manufacturer.

The case of unidirectional operation (digital signals will be output and received by the circuit, just not simultaneously) by transceiver 1 will now be described, referring again to FIG. 1. For the purposes of this discussion, it will be assumed that transmission line 20 connects transceiver 1 on a first chip with a driver and/or receiver on another chip.

In one mode, transceiver 1 will output a digital signal onto transmission line 20. In this case either a logical "1" or logical "0" is input to driver 3. As noted above in conjunction with the description to FIG. 2, enable node 52 will be active when the circuit is operating as a driver. Thus, a digital signal, directly corresponding to the digital signal input, will be output on node 6. The signal is then transmitted along transmission line 20 to the off-chip receiver circuit.

In a second mode, transceiver circuit 1 will receive a digital signal from an off-chip driver, via transmission line 20. In this case, the enable signal 52 is not activated, causing the driver 3 to tri-state (present a very high impedance). The signal received by transceiver 1 is then immediately input from transmission line 20 to differential receiver 11. The received digital signal is then output at node 17 as previously discussed in conjunction with FIG. 3.

Thus, it can be seen that the transceivers 1 and 2, as shown in FIG. 1, are very flexible in that a designer can use these circuits for bi-directional, simultaneous digital signal transmission when the circuits are on the same chip (and thus know to the designer). Further, if it is known that another chip uses this particular transceiver (e.g. when the chips are designed and/or fabricated by the same entity) bi-directional, simultaneous digital signal transmission is possible. Even, in the case where transmission line 20 is connected to a chip having unknown circuitry therein, the transceiver circuit 1, 2 of the present invention can still be used, albeit as a uni-directional driver/receiver, where digital signals are sent and received one at a time (as discussed immediately above).

Those skilled in the art will understand that when the transceiver of the present invention is utilized for chip to chip communications, the resistors 7 and 25 must be set to equal values. Further, the impedance of each of the drivers 3 and 21 must also be equal. And, the sum of the driver impedance and the resistor values for each transceiver circuit (i.e. Ra+impedance of driver 3; Rb+impedance of driver 21) must be equal to the impedance of transmission line 20. This allows the driver/receiver circuits to match the impedance of the transmission line to avoid reflection of the signal. In the circuits of FIG. 1, the resistances 7 and 25 can be varied by means known in the art, such as using a transistor, connecting an additional external resistor, or the like.

Figure 4:
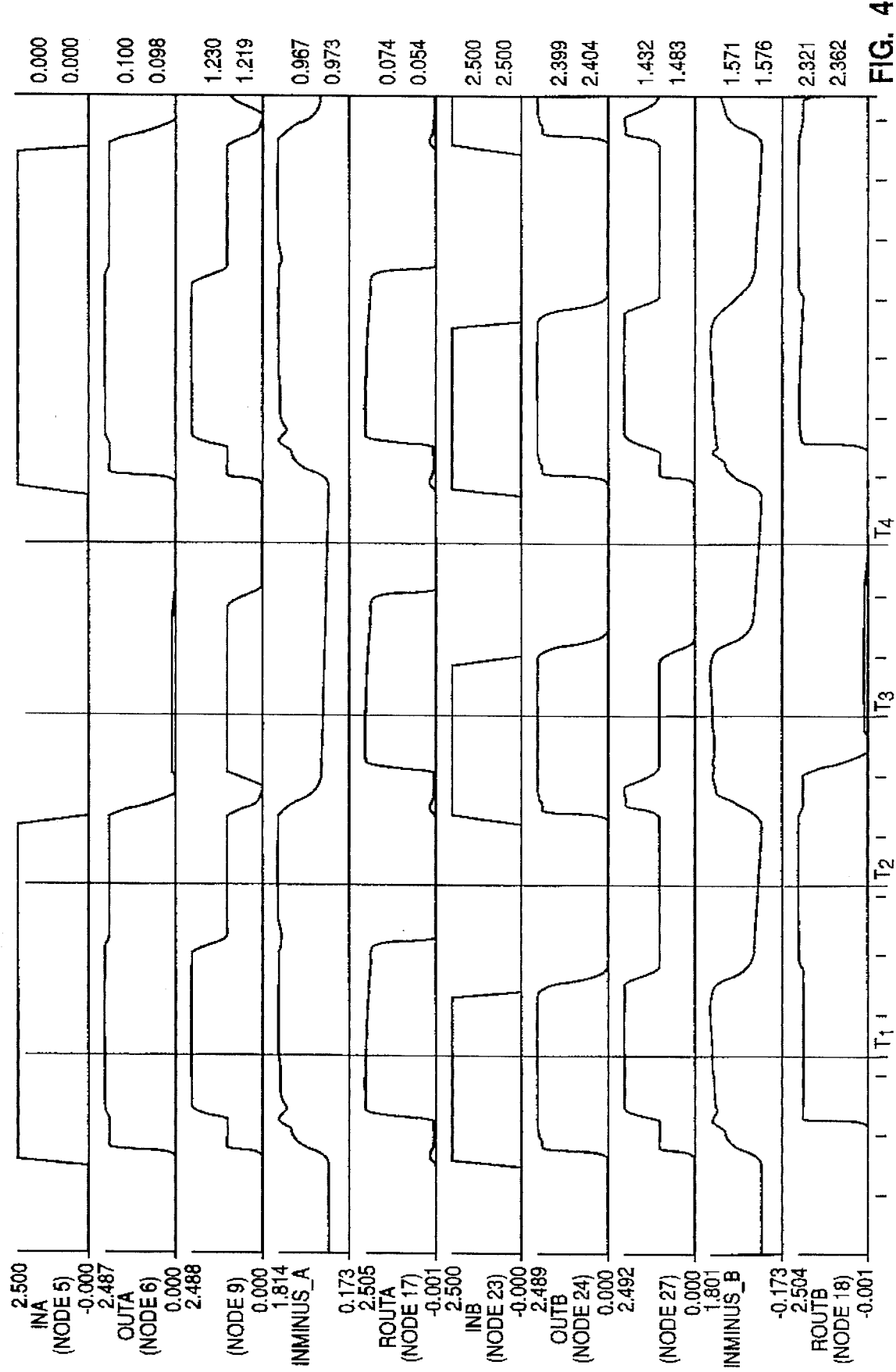
FIG. 4 is a graph showing the voltage waveforms at various points in the circuit of FIG. 1 when operated as a simultaneous, bidirectional driver/receiver circuit.
Figure 5:
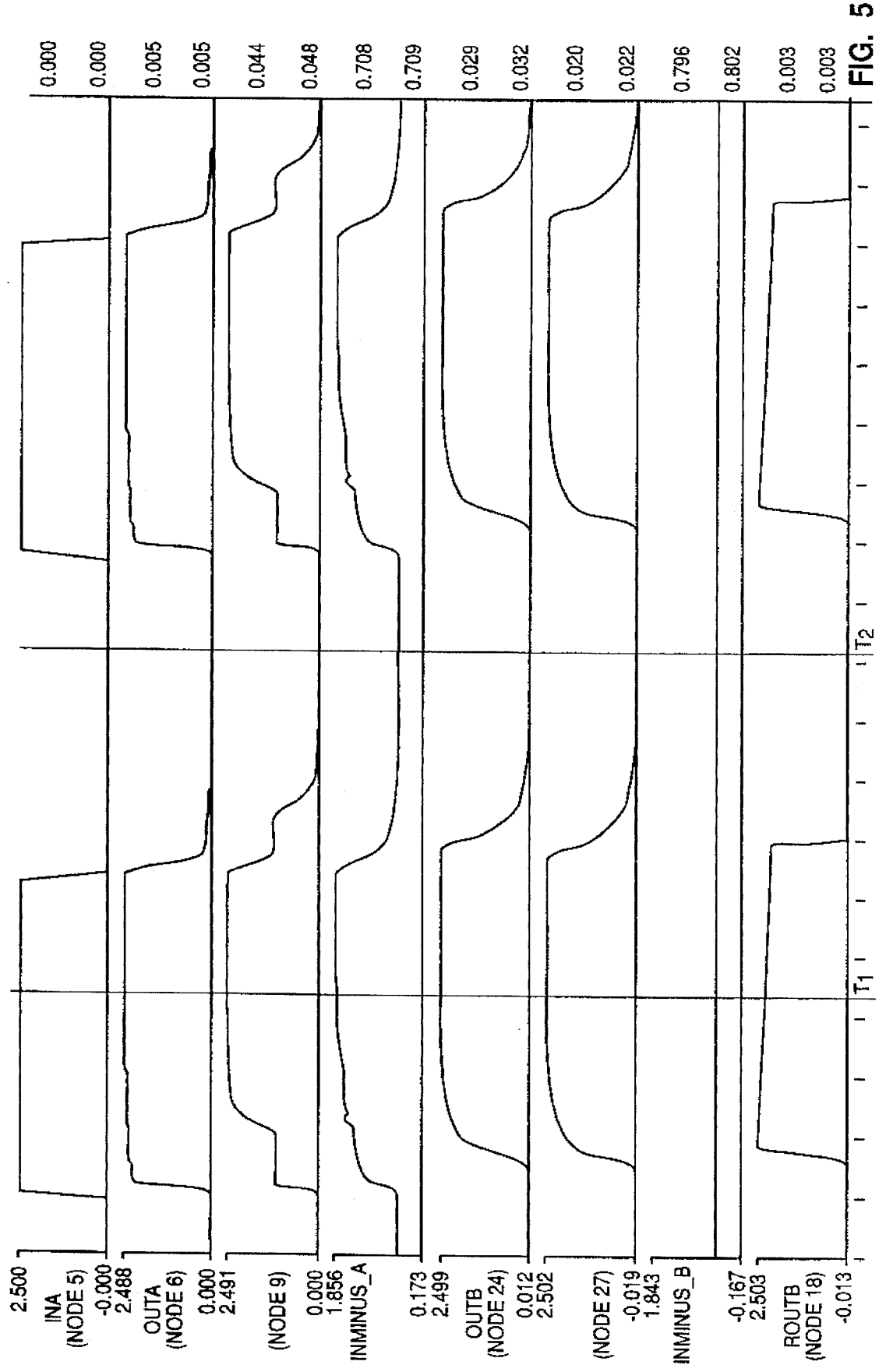
FIG. 5 is another voltage waveform graph of the voltage level over time for the circuit of FIG. 1 when operated as a unidirectional circuit.

FIGS. 4 and 5 are timing diagrams that will be used to further describe the present invention. These figures show voltage levels at the various nodes previously described with respect to FIG. 1, versus time. Referring to FIG. 4, it can be seen that at the first point in time (T1), the input to transceiver 1 at node 5 (INA) is a logical "1" and the input to transceiver 2 (INB) at node 23 is also a logical "1". This is the case where both driver/receiver pairs 1 and 2 are simultaneously transmitting a logical "1". The output of transceiver 2 is a logical "1" at node 18 (ROUTB), and the output of transceiver 1 is also a logical "1" at node 17 (ROUTA).

At time T2, the input to driver 3 at node 5 (and output at node 6) is a logical "1", while the input to driver 21 at node 23 (and output at node 24) is a logical "0". In this case, it can be seen that the output of receiver 11 at node 17 is a logical "0", which follows the output of driver 21. And, the output of receiver 33 at node 18 is a logical "1", following the output of driver 3. Thus, it can be seen that transmission of a logical "1" from driver 3 to receiver 33 occurs at the same time a logical "0" is transmitted from driver 21 to receiver 11.

At time T3, driver 3 is outputting a logical "0" at node 6 and driver 21 is outputting a logical "1" at node 24. Receiver 11 is outputting a logical "1" at node 17, while receiver 33 outputs a logical "0" at node 18. Again, receiver 11 and 33 output a signal which is identical to the output of driver 21 and 3, respectively. Thus, a logical "1" is transmitted from driver 21 to receiver 11 at the same time a logical "0" is transmitted from driver 3 to receiver 33.

T4 shows the case where both driver 3 and 21 are outputting a logical "0" at nodes 6 and 24, respectively. Similarly, receivers 33 and 11 are both outputting a logical "0", such that simultaneous, bi-directional transmission of a logical "0" occurs between driver 3 and receiver 33, as well as driver 21 and receiver 11.

FIG. 5 illustrates the embodiment wherein the transceiver circuit of the present invention, e.g. circuit 1, operates in conjunction with another non-identical driver/receiver pair. At time T1, driver 3 outputs a logical "1", which is in turn output by receiver 33 at node 18. Thus, when the transceiver circuit of the present invention receives a logical "1", it is output by the receiver 33. Similarly, at time T2, when a logical "0" is received from driver 3, the output at node 18 is also a logical "0". In this manner, it can be seen how the present invention can transmit digital signals (e.g. by driver 3) to non-identical circuit, and output digital signals (e.g. by receiver 33) received from other circuits using a unidirectional mode. It should be noted that the circuit of the present invention will operate in either the bi-directional, simultaneous, or uni-directional modes without any physical mode switching, or the like. The only requirement being that the impedance of the circuits must match, as previously described.

Figure 6A:
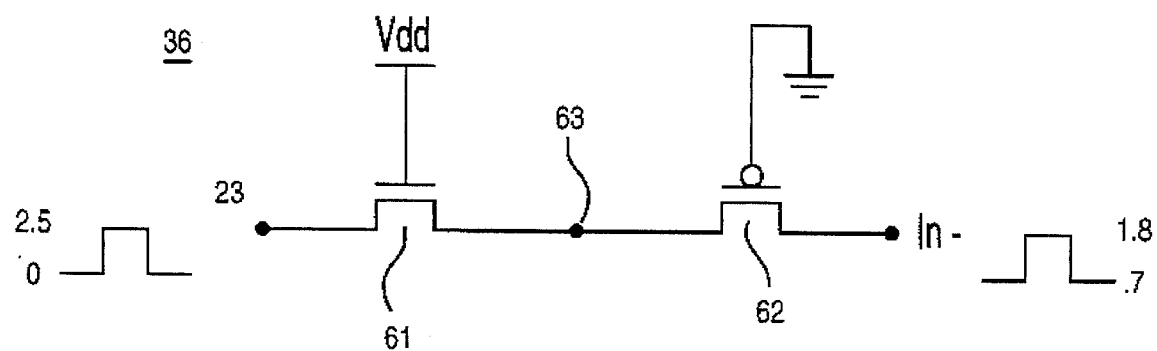
FIG. 6 is a circuit diagram of a second preferred embodiment of the present invention for providing non-negative voltages to a receiver circuit.
Figure 6B:
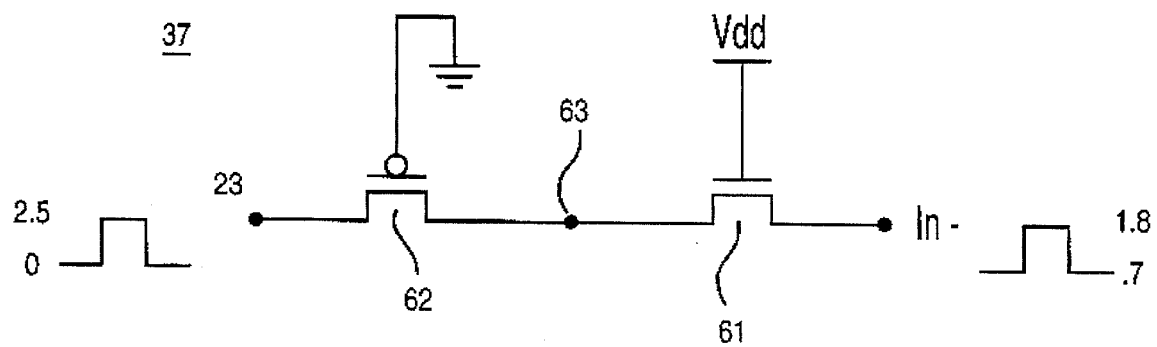

FIG. 6 shows another preferred embodiment of the present invention wherein circuits 36 and 37 can be substituted for the non-inverting buffer 35 of FIG. 1. Referring to circuit 36, an "N" type device 61 is connected to a "P" type device 62 through node 63. The input node 23 corresponds to input to driver 21, as illustrated in FIG. 1. Transistor 61 is connected to Vdd (e.g. 2.5 volts) and transistor 62 is connected to ground (0.0 volts). Thus, devices 61 and 62 are both always "turned on". In a first case, when 2.5 volts is applied to the input node 23, 1.8 volts will be present at node 63 due to the threshold voltage drop of 0.7 volts across "N" device 61. However, the threshold of "P" type device 62 is below 1.8 volts such that 1.8 volts will be present at the output node IN–. In a second case, if 0.0 volts are applied to node 23, the threshold voltage level across transistor 61 is high enough with respect to ground, that 0.0 volts will also be present at node 63. The threshold voltage level of transistor 62, however, will cause 0.7 volts to be present at output node IN–. Thus, it can be seen that a voltage range of 0.0 to 2.5 volts applied at node 23 will cause a voltage range of from 0.7 to 1.8 volts to be output by node IN– (to differential receiver 33). A threshold voltage of 0.7 volts across transistors 61 and 62 has been used to provide consistency between the description of non-inverting buffer 35 and receiver 33, discussed above, and not as a limitation. Other voltage output ranges are possible by using differently sized transistors.

Circuit 37 is similar to circuit 36, except that the order of the "N" type device 61 and "P" type device 62 has been reversed. In this case, when 2.5 volts is applied to node 23, a threshold voltage drop is not present across "P" type device 62 causing 2.5 volts also to be present at node 63. However, a threshold voltage drop of 0.7 volts is present across transistor 61, causing 1.8 volts to be output on node IN–. When 0.0 volts are applied to node 23, a threshold voltage of 0.7 volts is present across transistor 62, causing 0.7 volts to be present at node 63. This voltage is beneath the threshold of "N" device 61 such that a threshold voltage drop is not present thereacross and 0.7 will be present at output node IN–.

Although certain preferred embodiments have been shown and described it should be understood that many changes and modifications may be made therein without departing from the scope of the appended claims.

We claim:

1. A system that provides simultaneous, bidirectional transfer of signals between integrated circuit devices, comprising:

a first transceiver and a second transceiver interconnected to one another; and means for using a single voltage source to output a plurality of different voltages, based on said signals, to first and second differential receivers included in said first and second transceivers, respectively, said means for using, including:

an N transistor connected to said voltage source;

a P transistor connected to said N transistor and ground;

means for inputting said signals to both said N transistor and said P transistor; and means for varying the voltage level of said plurality of voltages in accordance with a threshold voltage drop across said N and P transistors.

2. A system according to claim 1 wherein said means for using comprises:

means for receiving a first voltage signal to be output by said first transceiver to said second transceiver;

means for outputting a first variable reference voltage signal to said first differential receiver, based upon said first voltage signal;

means for receiving a second voltage signal to be output by said second transceiver to said first transceiver; and means for outputting a second variable reference voltage signal to said second differential receiver, based upon said second voltage signal.

3. A system according to claim 2 further comprising:

means for receiving, by said first differential receiver, a second voltage signal, input to said first transceiver from said second transceiver; and means for receiving, by said second differential receiver, a first voltage signal, input to said second transceiver from said first transceiver.

4. A system according to claim 3 wherein said first differential receiver comprises means for supplying a first output voltage directly corresponding to said second voltage signal.

5. A system according to claim 4 wherein said second differential receiver comprises means for supplying a second output voltage directly corresponding to said first voltage signal.

6. A system according to claim 5 wherein said first and second voltage signals are transmitted simultaneously, and said first and second output voltages are supplied simultaneously with each other and said first and second voltage signals.

7. A system according to claim 6 further comprising a transmission line for interconnecting said first transceiver with said second transceiver.

8. A system according to claim 7 further comprising means for matching the impedance of said first and second transceiver with the impedance of said transmission line.

9. A system according to claim 1, further comprising:

first and second driver circuits, included in each first and second transceiver, respectively, for outputting said signals;

a transmission line, having a characteristic impedance, interconnecting said first and second transceivers; and means for selectively tri-stating the first and second driver circuits to present a relatively high impedance level when compared to the characteristic impedance of said transmission line.

10. A system according to claim 9 further comprising means for selectively tri-stating said first and second driver circuits such that said first and second driver circuits and said first and second differential receivers will operate sequentially, wherein said first and second transceivers can communicate with other non-identical transceivers.

11. A method of providing simultaneous, bidirectional transfer of signals between integrated circuit devices, comprising the steps of:

interconnecting a first transceiver and a second transceiver with one another; and using a single voltage source to output a plurality of different voltages, based on said signals, to first and second differential receivers included in said first and second transceivers, respectively, said means for using, including:

connecting an N transistor to said voltage source;

connecting a P transistor to said N transistor and ground;

inputting said signals to both said N transistor and said P transistor; and varying the voltage level of said plurality of voltages in accordance with a threshold voltage drop across said N and P transistors.

12. A method according to claim 11 wherein said step of using comprises the steps of:

receiving a first voltage signal to be output by said first transceiver to said second transceiver;

outputting a first variable reference voltage signal to said first differential receiver, based upon said first voltage signal;

receiving a second voltage signal to be output by said second transceiver to said first transceiver; and outputting a second variable reference voltage signal to said second differential receiver, based upon said second voltage signal.

13. A method according to claim 12 further comprising the steps of:

receiving, by said first differential receiver, a second voltage signal, input to said first transceiver from said second transceiver; and receiving, by said second differential receiver, a first voltage signal, input to said second transceiver from said first transceiver.

14. A method according to claim 13 further comprising the step of supplying, by said first differential receiver, a first output voltage directly corresponding to said second voltage signal.

15. A method according to claim 14 further comprising the step of supplying, by said second differential receiver, a second output voltage directly corresponding to said first voltage signal.

16. A method according to claim 15 further comprising the steps of:

simultaneously transmitting said first and second voltage signals;

simultaneously supplying said first and second output voltages with each other and said first and second voltage signals.

17. A method according to claim 16 further comprising the steps of:

matching the impedance of said first and second transceiver with one another; and matching the impedance of said first and second transceiver with the impedance of a transmission line interconnecting said first and second transceivers.

18. A method according to claim 11, further comprising the steps of:

outputting said signals by first and second driver circuits, included in each first and second transceiver, respectively;

interconnecting said first and second transceivers with a transmission line having a characteristic impedance; and selectively tri-stating the first and second driver circuits to present a relatively high impedance level when compared to the characteristic impedance of said transmission line.

19. A method according to claim 18 further comprising the step of selectively tri-stating said first and second driver circuits such that said first and second driver circuits and said first and second differential receivers will operate sequentially, wherein said first and second transceivers can communicate with other non-identical transceivers.

* * * * *